Patented Jan. 2, 1934

1,941,691

UNITED STATES PATENT OFFICE 1,941,691

METHOD OF VULCANIZATION

Leslie G. Jenness, Brooklyn, N. Y., assignor to St. Mungo Manufacturing Company of America, Newark, N. J., a corporation of New Jersey No Drawing. Application August 19, 1932
Serial No. 629,494

11 Claims. (Cl. 18—53)

This invention is directed to an improved method for the vulcanizing of material such as rubber, gutta percha, balata and materials of a similar nature, and has for one of its objects the provision of a method whereby the vulcanization of the material may be better controlled than by the processes heretofore suggested.

In certain prior methods for the vulcanizing of materials such as those above referred to, it has been suggested that the stock be milled with sulphur and after moulding, the material is immersed in a solution of an accelerator and gasoline or benzine. The gasoline or benzine is employed not only as a solvent for the accelerator but also as a solvent, to some degree, of the rubber or other material being treated, the accepted theory being that by the dissolving action of the gasoline on the rubber the accelerator is carried into the rubber to perform its function with respect to the vulcanizing agent.

It is difficult in such methods satisfactorily to control the vulcanizing action particularly with reference to the degree of penetration of the accelerator into the rubber or other material being treated, inasmuch as too long contact of the gasoline of the accelerating solution will of course have a deleterious effect on the rubber or other material being treated.

The present process provides for the control of the penetration of the accelerator with consequent control of the vulcanizing operation, permits the material to remain in contact with the accelerating solution longer than has been good practice heretofore and will enable materials such as rubber, gutta percha, balata and the like, or mixtures thereof, whether moulded or not, to be vulcanized much more satisfactorily than heretofore possible.

In the practice of my invention I propose to mill a stock containing a vulcanizing agent, sulphur for instance, the same as now done. The stock then may be moulded if desired and after moulding is immersed in a solution of the accelerator and gasoline, benzine, benzol, carbon tetrachloride, etc. and a material such as acetone, alcohol or equivalent materials.

The gasoline, benzine, etc. I shall refer to hereinafter as active materials meaning a solvent not only for the accelerator employed but for the rubber or other material being treated.

The materials such as acetone, alcohol, etc. I shall refer to as inactive in that these materials are not considered solvents for the rubber or other material being treated and consequently will retard the penetration of the accelerator into the rubber. These inactive materials however evaporate very rapidly, more rapidly than the gasoline, for instance, a characteristic I wish to take advantage of.

Accelerators of various types may be employed in the practice of my invention, for instance accelerators of the dithiocarbonic acid series, and accelerators of the dithiocarbamic acid series such as a derivative of carbon bisulfide. Other accelerators obviously may be employed but in any event I prefer the so-called low temperature accelerators commercially known as super-accelerators.

While my invention has a wide range of uses I might specifically explain the same in connection with the making of covers for golf balls.

In such use I propose to mill a batch of cover stock of rubber, gutta percha, balata and the like, about 1% of sulphur as a vulcanizing agent, any suitable coloring pigment and zinc oxide, the batch however not containing any accelerator. A suitable cover stock formula may be:

| | Percent |
|---|---|
| Rubber | 28.5 |
| Sulphur | .85 |
| Zinc oxide | .85 |
| Calcium base | 12.8 |

After thorough treatment on the mill, the material may be applied to the ball core and the ball placed in a mould where it is subjected to heat and pressure to shape the cover and to press the same firmly into engagement with the core. The average temperature employed in the moulding operation may be around 220° F. and the heat is kept on the mould three minutes or thereabouts. It will be appreciated of course that no vulcanization will take place during the moulding operation owing to the temperature employed and the short time the heat is maintained on the mould.

The ball may then be removed from the mould and immediately or at any convenient stage thereafter immersed in a dilute accelerator solution and finally treated in an oven, if the accelerator employed requires an elevated temperature. The accelerator or catalyst employed is preferably of such a character as to function at relatively low temperatures, for example between 100 to 105° F. A suitable accelerator as above mentioned is an accelerator of the dithiocarbamic acid series such, for example, as piperidine pentamethylene dithiocarbamate produced by reacting carbon bisulfide with piperidine. The accelerator solvent employed is an active material such as carbon tetrachloride or gasoline, the solution also containing an inactive material such as acetone or alcohol.

The inactive material employed such as the acetone above mentioned not being a solvent for the rubber will function as a diluent for the solution and hence retard the penetration of the accelerator into the cover stock, so that by varying the properties of the active and inactive materials of the solution practically any degree of vulcanization can be obtained that may be desired so far as the depth of the vulcanized area is concerned. This is a very advantageous characteristic in connection with the manufacture of sheet materials for instance where control of vulcanization is very desirable, my process providing for very accurate control of the penetration of the accelerator as well as the rate of evaporation of the accelerating solution.

It will be appreciated also that my process is very valuable in connection with the vulcanizing of golf ball covers made in accordance with the process above outlined inasmuch as by properly proportioning the gasoline and acetone the accelerating solution may be evaporated almost instantly after immersion of the ball, thereby precluding the possibility of the accelerator solution collecting at the bottom of the ball and overvulcanizing the ball at this area, besides dissolving the material of the stock.

It will be appreciated furthermore that my process is of value where vulcanization to a relatively great depth is desired, for example, in the lining of tanks with rubber and in many other instances, too numerous to mention, the drawback to present processes in this connection is that while the gasoline will carry the accelerator into the rubber it also at the same time dissolves the rubber so that there is a limit to the length of time that the material can be left in the accelerating solution. With my process, however, the usual amount of gasoline (active material) may be very materially reduced and the amount of acetone (inactive material) correspondingly increased so that the material may be left in the accelerating solution correspondingly longer in order to permit of the desired penetration of the accelerator without danger of detrimentally dissolving the material being treated.

What I claim is:—

1. In the treatment of materials such as rubber, gutta percha, balata and the like, the process which comprises incorporating a vulcanizing agent with the material being treated and then subjecting the mixture to the action of an accelerating solution containing a diluent capable of retarding the action of the solution upon the material being treated.

2. In the treatment of materials such as rubber, gutta percha, balata and the like, the process which comprises incorporating a vulcanizing agent with the material being treated and then applying an accelerating solution to the mixture, the accelerating solution containing a diluent capable of retarding the action of the solution upon the material being treated.

3. In the treatment of materials such as rubber, gutta percha, balata and the like containing a vulcanizing agent, the process which comprises applying an accelerating solution to the material being treated, the solution containing a diluent capable of retarding the action of the solution upon the material being treated.

4. In the treatment of materials such as rubber, gutta percha, balata and the like, containing a vulcanizing agent such as sulphur, the process which comprises applying an accelerating solution to the material being treated, said solution containing a solvent for the material being treated and a diluent such as acetone capable of retarding the action of the solution upon the material being treated.

5. In the treatment of vulcanizable mixtures such as rubber, gutta percha, balata and the like and a vulcanizing agent such as sulphur, the process which comprises subjecting such mixture to the action of a low temperature accelerator in solution in a material which is a solvent for the material being treated and a diluent capable of retarding the action of the solution upon the material being treated with the solution.

6. In the treatment of vulcanizable mixtures such as rubber, gutta percha, balata and the like, a vulcanizing agent such as sulphur, the process which comprises subjecting this mixture to the action of an accelerating solution containing an accelerator of the dithiocarbonic acid series, gasoline and a diluent capable of retarding the dissolving action of the gasoline on the material being treated.

7. In the treatment of vulcanizable mixtures such as rubber, gutta percha, balata and the like and sulphur, the process which comprises subjecting this mixture to the action of an accelerating solution containing an accelerator of the dithiocarbamic acid series, a solvent for the accelerator and for the material being treated, and a diluent capable of retarding the solvent action of the accelerator solvent on the material being treated.

8. In the treatment of vulcanizable mixtures such as rubber, gutta percha, balata and the like and sulphur, the process which comprises subjecting the mixture to the action of an accelerating solution containing a low temperature accelerator, a solvent for the accelerator and acetone.

9. In the treatment of vulcanizable mixtures such as rubber, gutta percha, balata and the like and sulphur, the process which comprises subjecting the mixture to the action of an accelerating solution containing a low temperature accelerator, such as piperidine pentamethylene dithiocarbamate, a solvent for the accelerator such as gasoline, and a retarding inactive material such as acetone.

10. In the manufacture of golf balls, the process which comprises moulding upon the ball core mixture of rubber, gutta percha, balata and the like and a vulcanizing agent such as sulphur under controlled conditions preclusive of vulcanization, removing the covered ball from the mould and then applying thereto an accelerating solution containing a low temperature accelerator, a solvent for the accelerator and an inactive material such as acetone, and thereafter subjecting the covered ball to a vulcanizing temperature.

11. In the manufacture of golf balls the process which comprises moulding a vulcanizable cover upon the ball core under controlled conditions preclusive of vulcanization, removing the covered ball from the mould and then applying an accelerating solution to the cover, the solution containing a diluent capable of retarding the action of the solution upon the cover, and thereafter subjecting the covered ball to a vulcanizing temperature.

LESLIE G. JENNESS.

CERTIFICATE OF CORRECTION.

Patent No. 1,941,691. January 2, 1934.

LESLIE G. JENNESS.

It is hereby certified that error appears in the printed specification of the above numbered patent requiring correction as follows: Page 2, lines 91 and 92, claim 5, strike out the words "with the solution"; and that the said Letters Patent should be read with this correction therein that the same may conform to the record of the case in the Patent Office.

Signed and sealed this 30th day of January, A. D. 1934.

F. M. Hopkins (Seal)

Acting Commissioner of Patents.